United States Patent
Guo et al.

(10) Patent No.: US 9,179,100 B2
(45) Date of Patent: Nov. 3, 2015

(54) VIDEO CONFERENCING METHOD AND DEVICE THEREOF

(71) Applicant: Polycom, Inc., San Jose, CA (US)

(72) Inventors: Xiaoliang Guo, Beijing (CN); Yuanfeng Guo, Beijing (CN)

(73) Assignee: Polycom, Inc., San Jose, CA (US)

( * ) Notice: Subject to any disclaimer, the term of this patent is extended or adjusted under 35 U.S.C. 154(b) by 335 days.

(21) Appl. No.: 13/663,618

(22) Filed: Oct. 30, 2012

(65) Prior Publication Data

US 2014/0118471 A1    May 1, 2014

(51) Int. Cl.
*H04N 7/14*   (2006.01)
*H04N 7/15*   (2006.01)

(52) U.S. Cl.
CPC ............. *H04N 7/155* (2013.01); *H04N 7/152* (2013.01)

(58) Field of Classification Search
USPC ............... 348/14.01–14.16; 370/259–271, 370/351–357; 379/67.1–88.28, 201.01, 379/202.01–207.01; 455/412.1–426.2, 455/456.1–460, 550.1–566, 575.1–575.9, 455/90.1–90.3; 704/201–207, 217–248
See application file for complete search history.

(56) References Cited

U.S. PATENT DOCUMENTS

| | | | | |
|---|---|---|---|---|
| 5,710,591 A | * | 1/1998 | Bruno et al. | 348/14.09 |
| 7,466,334 B1 | * | 12/2008 | Baba | 348/14.06 |
| 7,558,221 B2 | * | 7/2009 | Nelson et al. | 370/260 |
| 8,121,264 B1 | * | 2/2012 | Hogg et al. | 379/88.22 |
| 8,135,115 B1 | * | 3/2012 | Hogg et al. | 379/88.22 |
| 2006/0146124 A1 | * | 7/2006 | Pepperell et al. | 348/14.08 |
| 2010/0262669 A1 | * | 10/2010 | Ono et al. | 709/206 |
| 2010/0271456 A1 | * | 10/2010 | Tsumura et al. | 348/14.08 |
| 2012/0274731 A1 | * | 11/2012 | Shanmukhadas et al. | 348/14.08 |
| 2013/0250035 A1 | * | 9/2013 | Murali et al. | 348/14.09 |

* cited by examiner

*Primary Examiner* — Hemant Patel
(74) *Attorney, Agent, or Firm* — Blank Rome, LLP

(57) ABSTRACT

A method of video conferencing among two or more video conference endpoints is provided, wherein the method comprises steps of: processing media data of the video conference into unified coding formats while switching media data of the video conference between the two or among more video conference endpoints; and saving the processed media data into recording files of continuous presence mode and lecture mode, wherein the recording file of continuous presence mode saves media data generated by the two or more video conference endpoints, the recording file of lecture mode saves media data generated by a video conference endpoint who is the lecturer in the video conference. Accordingly, a device of video conferencing is provided.

30 Claims, 9 Drawing Sheets

VIDEO CONFERENCING METHOD AND DEVICE THEREOF

TECHNICAL FIELD

This disclosure relates to telecommunications, especially to a method and device for a video conference.

DESCRIPTION OF THE RELATED ART

Video conferencing enables face to face conferences between or among individuals far away from each other or one another using audio data and video data communications. A video conference can include at least two sites (point to point) or a plurality of sites (multipoint)

People participating in a video conference interact with other sites through video conference endpoints (EP). Video conference endpoints are those in a network that can provide real time and bidirectional audio/video/other content data communication with other video conference endpoints or a multipoint control unit (MCU). The video conference endpoint can provide only audio, only video or only other content data, or any combination thereof, etc. Exemplary video conference endpoint can include POLYCOM® VSX® and HDX® series (POLYCOM VSX and HDX are registered trademarks of Polycom, Inc.) that can be obtained from Polycom, Inc. A video conference endpoint sends audio, video and/or other content data from local site to one or more remote sites, and displays video and/or other content data received from one or more remote sites.

A MCU can be used to manage a video conference. A MCU is the conference control entity that could be in a node or a video conference endpoint of the network or any other position. A MCU is also called a video conference server acting as a switch, which extracts information such as audio, video, data, etc. and signaling after synchro-separation of information flow received from a plurality of video conference endpoints, and then inputs the information and signaling of video conference endpoints to processing module for corresponding audio combining or selecting, video combining or selecting, data broadcast and routing, timing and conference control etc., and finally combines all the information together desired by individual conference site and sends them to corresponding video conference endpoints. The MCU could receive and process a plurality of media streams from access port based on a particular discipline and distribute them to connected channels through other ports. Examples of MCU can include MGC-100 and RMX® 4000 (RMX 4000 is a registered trademark of Polycom, Inc.) that could be obtained from Polycom, Inc. Common MCUs are disclosed in a plurality of patents and patent applications. Some MCUs can include two logic units: a multipoint controller (MC) and a multipoint processor (MP), wherein, a MC is mainly in charge of coordination of media connection using sequences among video conference endpoints and defining specification of sending content using H.245; a MP is the one that actually engages in audio/video processing, switching and other processing based on control specification of the MC. A MC of a MCU is the mandatory managing function module, while a MP is chosen based on video processing capability of video conference endpoints and need of general contextual framework. More specific definitions of the endpoint and the MCU could be found in standards of International Telecommunications Union, for example, but not limited to H.320, H.324 and H.323 standards. Additional information on ITU standards could be found on ITU website www.itu.int.

Generally, a MCU may need to decode every input video stream into an uncompressed full-frame video stream, manage a plurality of uncompressed video streams associated with the conference, and combine and/or manage a plurality of output streams. Thereby, processing and managing a plurality of video conferences needs huge amount of expensive computing resources, and thus a MCU typically is an expensive and much complicated product.

As for small enterprises or small users such as institutes, individuals and household users, etc. for whom it is not appropriate to invest much on this, the MCU is obviously not appropriate, and especially for a point to point conference, the MCU seems much redundant.

When the video conference is in progress, a recording and playing server could be used to make a record of the video conference. Examples of the recording and playing server can include RSS® 4000 that could be obtained from Polycom, Inc. (RSS 4000 is a registered trademark of Polycom, Inc.).

A recording and playing server can play those demo data recorded beforehand in the form of streaming media on users' screens, thus saving time and resources. Educational institutions for example can play studying content to remote sites in the form of streaming media, thus enlarging its teaching coverage. When doing educating and training for new employees, this ideal measure can be taken to take archives.

There are three ways to record a video conference in the prior art:

One way is to record by a video conference endpoint, wherein a recording system is integrated in a video conference endpoint, and when a video conference is in progress, the recording function of the video conference endpoint is enabled to record and save data such as local audio/video of the video conference endpoint, etc., or to record and save remote audio/video data received from another video conference endpoint. Due to limited capability of the video conference endpoint, data of only one video conference endpoint could be recorded at a time.

Another way is probing recording by a probing recording server, wherein the probing recording server accesses the network where video conference endpoints and the MCU are located, and during a video conference, the probing recording device probes the network for communication data packets, and the filtering device extracts and saves data to be recorded independently.

Still another way is to triage and control the media stream by a MCU for recording. A MCU is connected to video conference endpoints and a video conference recording device respectively, and media stream to be recorded is sent to the video conference recording device by the MCU, wherein a single media stream is used, i.e., data of only one video conference endpoint is recorded at a time. The system architecture for triaging and controlling the media stream by a MCU for recording is shown in FIG. 1. In FIG. 1, video conference endpoints EP1, EP2-EPN connect a MCU in the network N through equivalent or different networks N1, N2-NN, the network N1, N2-NN, N could be, but not limited to Packet Switching Network, Circuit Switching Network, Integrated Services Digital Network (ISDN), Public Switched Telephone Network (PSTN), Asynchronous Transfer Mode (ATM) Network, Internet or Intranet. The MCU is connected with a recording and streaming system (RSS), which is responsible for recording a video conference and also provides playing function. Media stream to be recorded is determined by the MCU and sent to the RSS for recording in the form of a single media stream.

The above mentioned video conference recording either needs a MCU, or records a conference using a single media stream other than combination of a plurality of media streams, therefore users can only access a part of the video conference and can't be immersive. In some cases, when a video conference is held among video conference endpoints, users may need to record all their video content.

Besides, recording content is written into one file and needs reprocessing if there are additional playing requirements.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

A method of video conferencing among two or more video conference endpoints, the method comprises steps of: processing media data of the video conference into unified coding formats while switching media data of the video conference between the two or among more video conference endpoints; and saving the processed media data into recording files of continuous presence mode and lecture mode, wherein the recording file of continuous presence mode saves media data generated by the two or more video conference endpoints, the recording file of lecture mode saves media data generated by a video conference endpoint who is the lecturer in the video conference. A lecturer is a video conference endpoint used by one or more users who speak in the conference.

Further, a device of video conferencing between two or among more video conference endpoints is provided, wherein the device comprises: a network interface module, used for receiving and transmitting media data of the video conference; a video switching conference module, used for switching the media data of the video conference; a backend transcoding module, used for processing the media data of the video conference into unified coding formats, and saving the processed media data into recording files of continuous presence mode and lecture mode; and a storage module, used for saving the recording files; Wherein, the recording file of continuous presence mode saves media data generated by the two or more video conference endpoints, the recording file of lecture mode saves media data generated by a video conference endpoint who is the lecturer in the video conference.

DETAILED DESCRIPTION

The subject matter herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Figure 1:
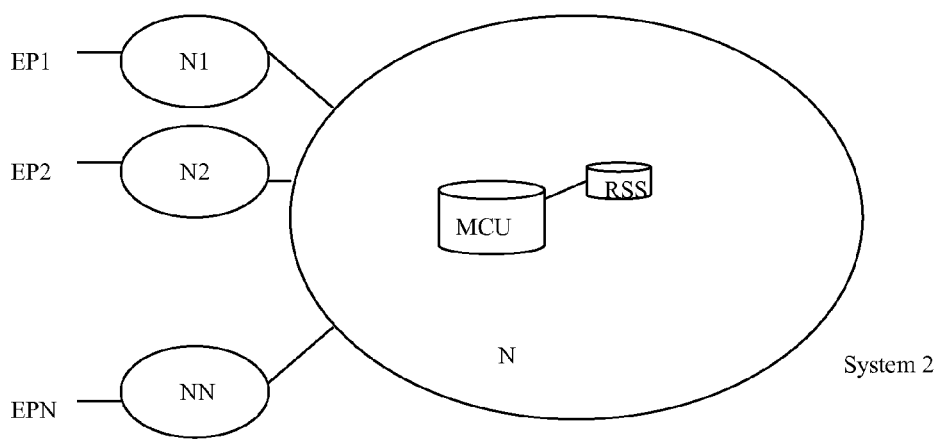
FIG. 1 illustrates the system architecture comprising a MCU and a video conference recording device according to the prior art.
Figure 2:
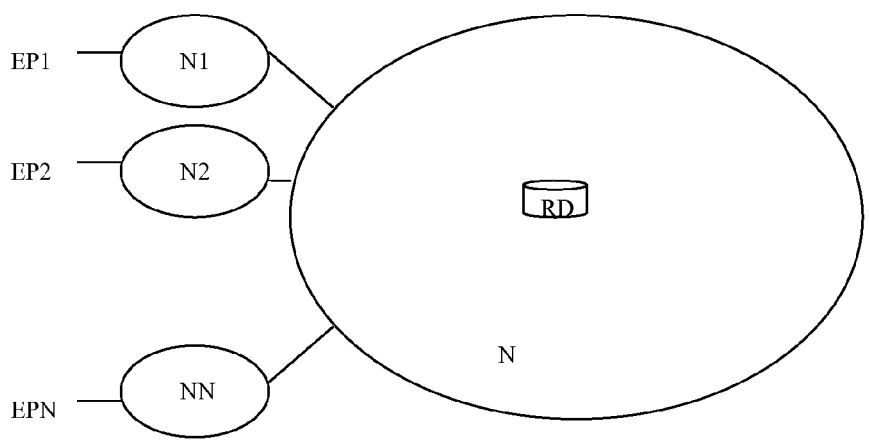
FIG. 2 illustrates the system architecture according to one embodiment.

FIG. 2 illustrates a system architecture for recording in a multipoint conference. System 2 can include network N, network N1, network N2-network NN, endpoints EP1, EP2-EPN, and a video conference recording device RD. Network N, network N1, network N2-NN can represent a single network or a combination of two or more networks respectively. Network N, network N1, network N2-network NN can be networks of any kind, comprising packet switched network, circuit switched network and Integrated Services Digital Network (ISDN), Public Switching Telephone Network (PSTN), Asynchronous Transfer Mode (ATM) Network, Internet or Intranet. Multimedia communication in the network could be based on any communication protocols, including H.320, H.324, H.323, SIP, etc.

The part described by system 2 only includes and describes most relative elements. System 2 still can include other parts that are not described herein. People skilled in the art may understand that every system may have endpoints and networks of different numbers as desired by the arrangement and the system. However, here it illustrates system 2 with a plurality of endpoints, a plurality of networks and a video conference recording device 400.

Communication among endpoints EP1, EP2-EPN can include signaling and controls, audio, video and/or other content data. Different combinations of EP1, EP2-EPN can participate in the conference. EP1, EP2-EPN can provide audio, video, other content data, signaling, controls or the combinations thereof.

Figure 3A:
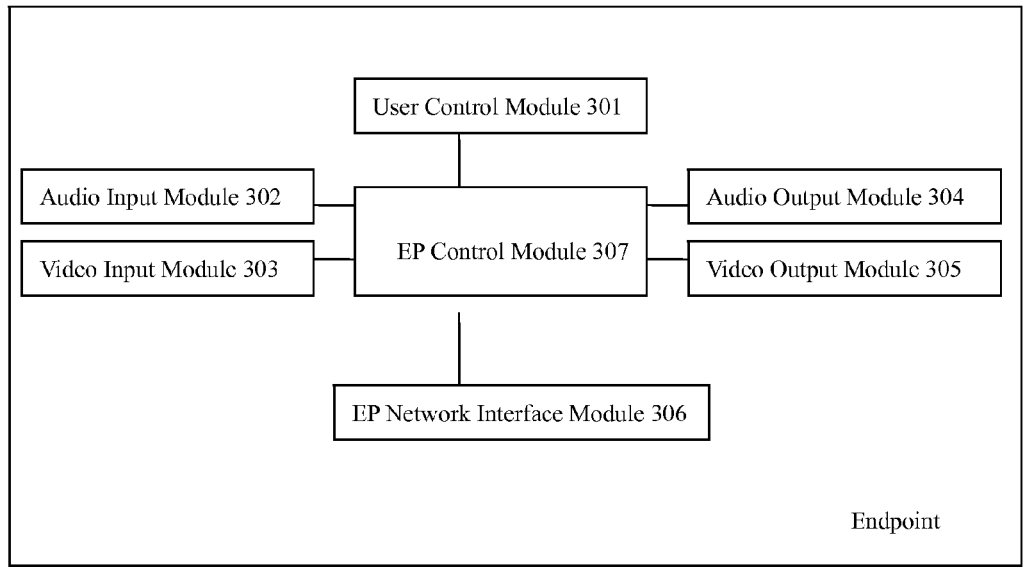
FIG. 3a illustrates a block diagram of an endpoint according to one embodiment.

FIG. 3a illustrates a block diagram of an endpoint according to another embodiment of the present invention. Any one of endpoints EP1, EP2-EPN can include a user control module 301, used for interfacing the user and endpoints. The user control module 301 could be for example a dialing pad using DTMF signals (for example, keypad of the telephone), and a dedicated control device using control signals other than DTMF signals or a remote camera control signaling unit based on H.224 and H.281 of ITU standards. In one embodiment, the user control module 301 is a keypad. Alternatively, the user control module 301 could be the software that shows a virtual keyboard on a display screen. In another embodiment, the user control module 301 can include a DTMF generator, such as a universal keyboard of touch-tone telephone and/or a remote controller for a TV set.

Figure 3B:
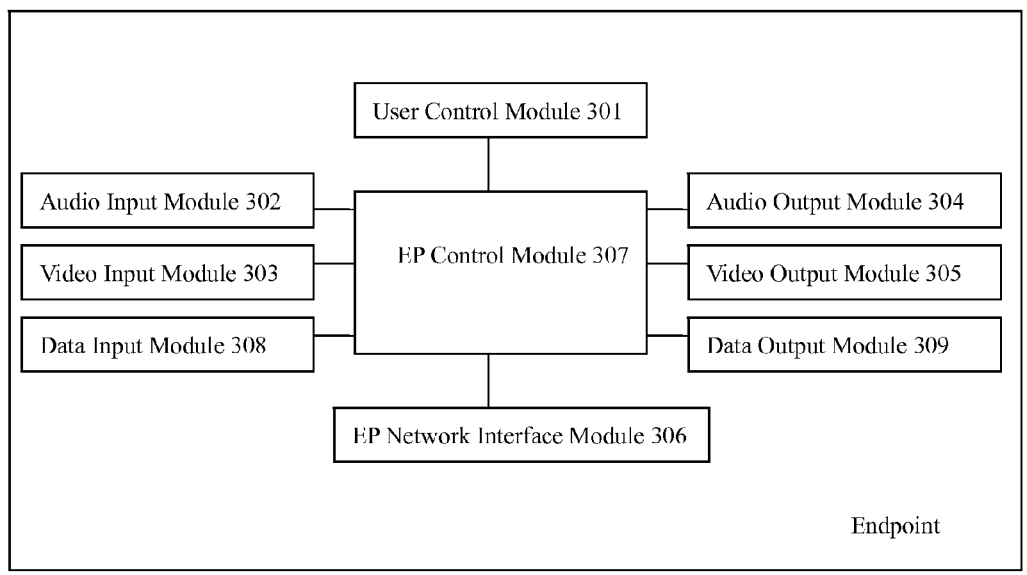
FIG. 3b illustrates a block diagram of an endpoint according to another embodiment.

Endpoints EP1, EP2-EPN can also include an audio input module 302 that allows users of endpoints to talk in the conference or contributes to the voice and noise heard by other users, such as one or more microphones; an video input module 303 that allows endpoints EP1, EP2-EPN to input live video data to the conference, such as a camera; an audio output module 304 that enables the conference to be heard, such as one or more loudspeakers; a video output module 305 that enables the conference to be shown, such as a display screen. Those endpoints that lack one of such parts may encounter limitations with respect to the way they participate in a conference. Alternatively, endpoints EP1, EP2-EPN can also include a data input module 308 by which the endpoint hopes to show other content data to other endpoints and a data output module 309 that displays the content data, referring to FIG. 3b. Other content data could be for example demo images similar to those made by PowerPoint, video/audio clips, raster/vector images, animations, documents, etc.

Endpoints EP1, EP2-EPN can also include an EP network interface module 306, the EP network interface module 306 could receive communication from the video conference recording device through the network. The EP network interface module 306 may deal with communications according to one or more communication standards comprising H.320, H.321, H.323, H.324, Session Initiation Protocol (SIP), etc. The EP network interface module 306 could receive control information, audio, video, and/or other content data information from the video conference recording device and send them vice versa. More information about communication between endpoints and the video conference recording device and information describing signaling and controls could be found in H.320, H.321, H.323, H.324 standards of International Telecommunication Union or in IETF internet working group website.

Endpoints EP1, EP2-EPN can also include an EP control module 307 for controlling separate operations of the user control module 301, the audio input module 302, the audio output module 304, the video input module 303, the video output module 305, the EP network interface module 306, and alternatively the data input module 308 and the data output module 309 in the endpoint and the interaction thereof.

Figure 4A:
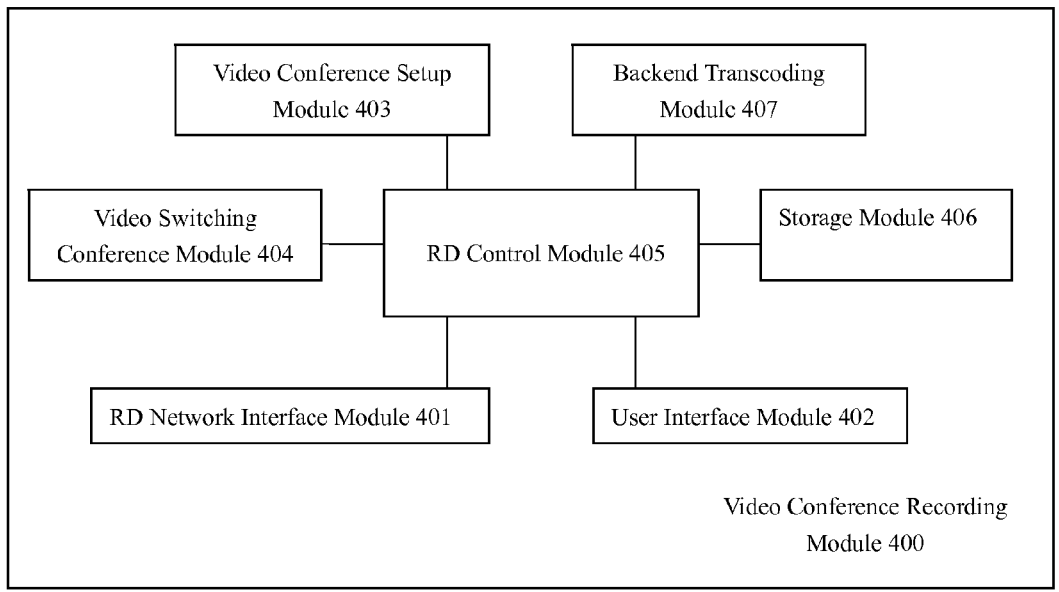
FIG. 4a illustrates a block diagram of the video conference recording device according to one embodiment.

FIG. 4a illustrates a block diagram of the video conference recording device according to one embodiment of the present invention. Video conference recording device 400 can include an RD network interface module 401, a user interface module 402, a video conference setup module 403, a video switching conference module 404, an RD control module 405, a storage module 406 and a backend transcoding module 407.

The RD network interface module 401 may receive communication through the network from a plurality of video conference endpoints. The RD network interface module 401 may deal with communications according to one or more communication standards comprising H.320, H.321, H.323, H.324, Session Initiation Protocol (SIP), etc. RD network interface module 401 could receive control information and content data information from other endpoints and send them to other endpoints. More information about communication between endpoints and the video conference recording device 400 and information describing signaling and controls could be found in H.320, H.321, H.323, H.324 standards of International Telecommunication Union or in IETF internet working group website.

The user interface module 402 could provide users with an interactive interface and video conference display. Users may setup and control a video conference through user interface module 402, for example, users may setup the beginning time of a video conference, may control the beginning and ending of recording, and may setup the mode to display a video conference in video conference endpoints. Detailed description could be found in later description.

The video conference setup module 403 could be used to create a virtual video conference room. The creation of a virtual video conference room could be done before a video conference begins, and could also be done at the same time as a video conference is initiated. The way to create could be that a user requests to create through the user control module 301 of an endpoint, and alternatively, the way to create could be to create through the user interface module 402 of the video conference recording device 400. A series of setups could be made through the video conference setup module 403 which can include but not limited to setup of the way to begin and end recording, setup of the time to begin a conference, setup of whether to send a conference alert, etc.

The video switching conference module 404 could be used to create and release connections of a video conference, negotiate the ability between two or among all the endpoints that participate in the video conference, and switch audio, video and/or other content data of the video conference on the connection. One video switching conference module 404 corresponds to a video conference separately. A plurality of video conferences held simultaneously needs a plurality of video switching conference modules 404 accordingly.

The storage module 406 is used for storing recoding files. A recording file can include recorded audio, video and/or other content data. The storage module 406 can include but not limited to RAM, ROM, ERDROM, flash or other memory technologies, CD-ROM, Digital Versatile Disc (DVD) and other optical storage, tape, cassette, magnetic disc storage or other magnetic storage device.

Figure 4B:
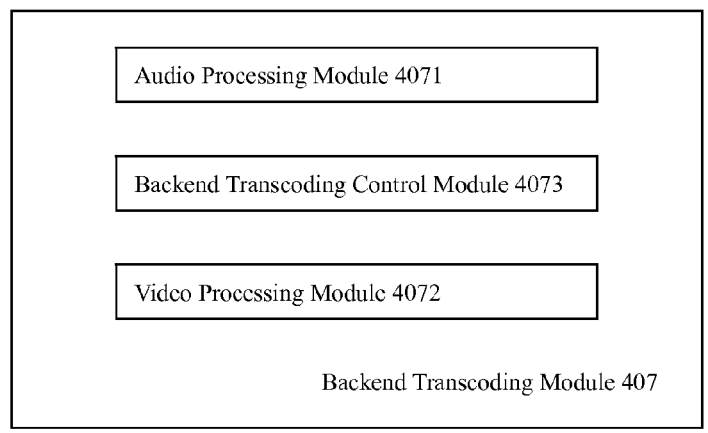
FIG. 4b illustrates a block diagram of the backend transcoding module according to one embodiment.

FIG. 4b illustrates a block diagram of the backend transcoding module according to one embodiment of the present invention. The backend transcoding module 407 is used for functions such as processing received video, audio, etc., to support displaying, recording and playing of a video conference. Wherein, backend transcoding module 407 can include an audio processing module 4071, a video processing module 4072 and a backend transcoding control module 4073. The backend transcoding control module 4073 controls processing of the audio processing module 4071 and the video processing module 4072. The video processing module 4072 could be a logic module that receives and sends compressed video stream, the audio processing module 4071 could be a logic module that receives and sends compressed audio stream, compressing protocols for video stream could be: H.263, H.264, MPEG2, MPEG4, etc., and compressing protocols for audio stream could be: G711, G.722, G729, ACC, etc. The backend transcoding module 407 takes different processing based on different needs. Common functions of the video processing module 4072 known in the prior art are not described in detail herein. Alternatively, wherein the audio processing module 4071 can include at least a DTMF (Dual Tone A plurality of Frequencies) module (now shown). The DTMF module can detect and/or know DTMF signals in the audio stream received from video conference endpoints. DTMF module could transform DTMF signals into DTMF control data, for example to control user name and password access of a conference, or control conference display mode on video conference endpoints. Alternatively, the audio processing module 4071 can also include a voice recognition module (not shown). The voice recognition module may use voice commands of conference participants for controlling a video conference.

Figure 4C:
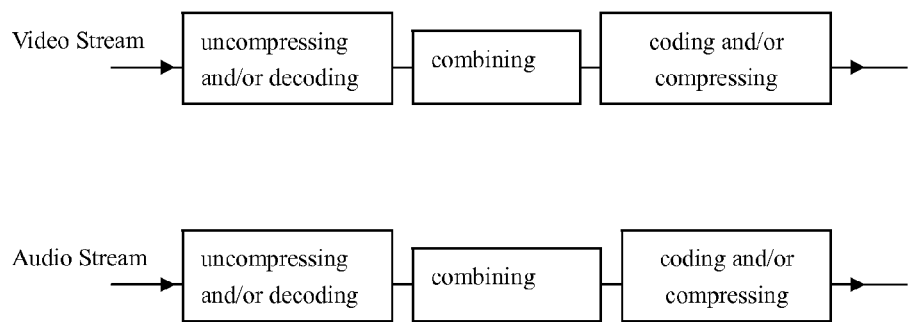
FIG. 4c illustrates the flowchart of media stream processing by the backend transcoding module based on continuous presence mode according to one embodiment.
Figure 4D:
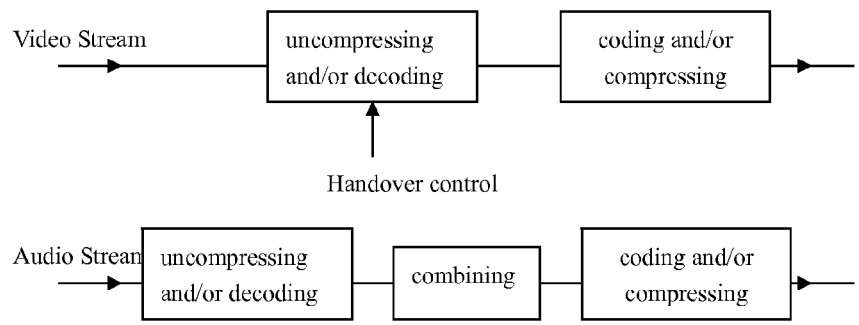
FIG. 4d illustrates the flowchart of media stream processing by the backend transcoding module based on lecture mode according to one embodiment.

In one embodiment, the backend transcoding module 407 needs to support conference display on video conference endpoints. Conference display can be of continuous presence (CP) mode and lecture mode. In continuous presence mode, a plurality of video conference endpoints are displayed continuously. In lecture mode, only the lecturer is displayed. For example in continuous presence mode, under the control of the control module 4073, the video processing module 4072 receives a plurality of compressed video input streams from video conference endpoints. Then the video processing module 4072 makes uncompressing and decoding processing of them, and makes a combination of the plurality of video streams from different endpoints to form one video stream for every endpoint used for layout display. Detailed description on layout display will be given later. Then the combined video streams for different endpoints are sent through the RD network interface module 401 after coding and/or compressing. Still in continuous presence mode, under the control of the control module 4073, the audio processing module 4071 receives a plurality of compressed audio input streams from video conference endpoints. Then the audio processing module 4071 makes uncompressing and decoding processing of them, and makes a combination of the plurality of audio streams from different endpoints to form one audio stream for every endpoint. Then the combined video streams for different endpoints are sent through RD network interface module after coding and/or compressing. FIG. 4c illustrates the flowchart of media stream processing by the backend transcoding module based on continuous presence mode according to one embodiment of the present invention. In lecture mode, under the control of the control module 4073, the audio processing module 4071 receives a plurality of compressed audio input streams from video conference endpoints. Then it makes uncompressing and decoding processing of them, and makes a combination of the processed plurality of audio streams from different endpoints to form one audio stream for every endpoint. Then the combined video streams for different endpoints are sent through RD network interface module after coding and/or compressing. FIG. 4d illustrates the flowchart of media stream processing by backend transcoding module based on lecture mode according to one embodiment of the present invention. Alternatively, the audio processing module 4071 could detect audio energy information. Audio processing module 4071 could analyze audio signals received from endpoints, and determine energy of every audio signal. If the audio signal of some endpoint lasts longer than a predetermined time, for example 3 seconds, and the accumulated volume in the 3 seconds is the most loud, then a handoff is made to the new video stream through the backend transcoding control module 4073. Then processing of uncompressing, compressing, coding and decoding of video stream is needed based on the capability of endpoints. Thus fast handover is realized without unnecessary ping-ping handover among the lectures.

In another embodiment, backend transcoding module needs to process audio, video and/or other content data received from video conference endpoints, to transform them into general unified coding formats for saving in recording files. Recording files can include that of continuous presence mode and that of lecture mode. The recording file of continuous presence mode saves media data generated by a plurality of video conference endpoints that participate in the video conference, the recording file of lecture mode saves media data generated by video conference endpoints who are the lecturers in the video conference. For example, in continuous presence mode, under the control of the control module 4073, video processing module 4072 receives a plurality of compressed video input streams from video conference endpoints. Then the video processing module 4072 makes uncompressing and decoding processing of them, and makes a combination of the plurality of video streams from different endpoints to form one video stream for every endpoint used for layout display. Detailed description on layout display will be given later. Then the video processing module 4072 writes them into recording file 1 to save after coding and/or compressing. Under the control of the control module 4073, the audio processing module 4071 receives a plurality of compressed audio input streams from video conference endpoints. Then the audio processing module 4071 makes uncompressing and decoding processing of them, and makes a combination of the processed plurality of audio streams from different endpoints to form one audio stream based on setup or selection. Then the audio processing module 4071 writes them into recording file 1 to save after coding and/or compressing. In lecture mode, under the control of the control module 4073, the audio processing module 4071 receives a plurality of compressed audio input stream from video conference endpoints. Then the audio processing module 4071 makes uncompressing and decoding processing of them, and makes a combination of the processed plurality of audio streams from different endpoints to form one audio stream based on setting or selection, which are written into recording file 2 to save after coding and/or compressing. Alternatively, the audio processing module 4071 could detect audio energy information. The audio processing module 4071 could analyze audio signals received from endpoints, and determine energy of every audio signal. If the audio signal of some endpoint lasts longer than a predetermined time, for example 3 second, and the accumulated volume in the 3 seconds is the most loud, then a handoff is made to the new video stream by the backend transcoding control module 4073. Then coding and compressing of the video stream is made based on setting or selection. Thus fast handover is realized without unnecessary ping-ping handover among the lectures.

In still another embodiment, backend transcoding module needs to make reprocessing of content data in recording files for saving into other files or sending to other endpoints for playing through RD network interface module 401. Reprocessing can include, for example, transforming audio/video data of one coding format into another.

RD control module 405, is used to control operations of the RD network interface module 401, the user interface module 402, the video conference setup module 403, the video switching conference module 404, the storage module 406 and the backend transcoding module 407 and the interactions thereof.

Figure 5:
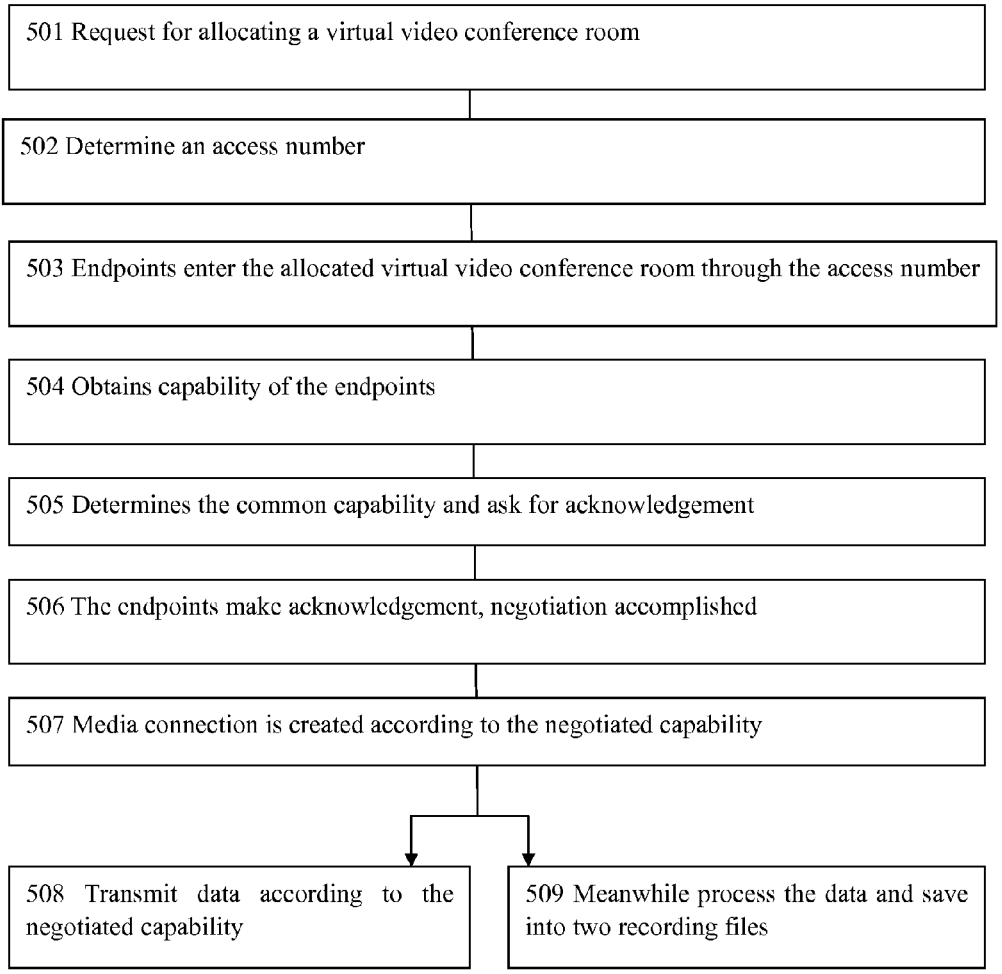
FIG. 5 illustrates the flowchart of creating a media connection and recording using the video conference recording device according to a preferred embodiment.

FIG. 5 illustrates a flowchart of creating a media connection and recording using the video conference recording device. In one embodiment, a user generates DTMF signals through an endpoint and sends them to the video conference recording device 400 to ask for allocating a virtual video conference room (501). Then the user specifies an access number or video conference recording device 400 allocates automatically an access number (502). Then a first video conference endpoint and a second video conference endpoint enter the allocated virtual video conference room through the access number (503). Next, video conference recording device 400 obtains the capability of the first video conference endpoint and the second video conference endpoint, which can include audio/video coding protocols, audio/video code rate, video resolution, video frame rate (504). Accordingly, video conference recording device 400 determines the capability supported by both the first video conference endpoint and the second video conference endpoint, which are sent to the first video conference endpoint and the second video conference endpoint for acknowledgement (505). For example, if the first video conference endpoint supports the video resolution of 1080p, while the second video conference endpoint supports the video resolution of 720p, then the video conference recording device 400 determines the capability supported by both the first video conference endpoint and the second video conference endpoint is the video resolution of 720p. Then the first video conference endpoint and the second video conference endpoint make acknowledgement, negotiation accomplished (506). Thus media connection between the first video conference endpoint and the second video conference endpoint is created according to the negotiated capability (507). Then the first video conference endpoint and the second video conference endpoint send and receive audio, video and/or other content data to and/or from each other according to the negotiated capability (508). Meanwhile audio, video and/or other content data of the video conference is processed to make unified coding formats, and the processed data is saved into two recording files, as mentioned above (509).

According to the above embodiment, the video conference recording device 400 is leveraged to create a video conference, saving the use of a MCU. Besides, the video conference is recorded without any need of a MCU, and meanwhile, video conference media stream to be recorded needs no additional transmission, thus bandwidth resource is saved.

Alternatively, in step 502, the user may further setup beginning time of the conference, and that endpoints that participate in the conference are the first video conference endpoint and the second video conference endpoint and may also setup alert. At some time before the conference should begin, for example 20 minutes before the conference should begin, the video conference recording device 400 sends a video conference alert to the first video conference endpoint and the second video conference endpoint who are going to participate in the conference, and the way to alert could be the way already known, such as e-mails, short messages, phone calls etc.

Alternatively, in step 502, the user may specify an access password, or the video conference recording device 400 allocates automatically an access password. The way to begin recording could also be setup which can include triggering the recording once media connection is created, triggering the recording at a predetermined time or triggering the recording by the user. The way to end recording could also be setup which can include ending the recording once the video conference ends, ending the recording at a predetermined time, or ending the recording by the user. Alternatively, in steps 508 and 509, the user interface module 402 could be accessed by endpoints through the network. Thus setup of the way to begin, pause and end recording, and control and management of video conference recording could be input through the user interface module 402. In step 508, generally, switching of audio and video needs uncompressing, decoding, coding and/or compressing, however, as the audio/video is sent based on negotiated audio/video coding protocols, audio/video code rate, video resolution, video frame rate, for the endpoint that only requires to present video of the other endpoint in a point to point video conference, or other video conference endpoints that are setup or selected to present only audio and/or video of some endpoint, direct switching without any uncompressing, decoding, coding and/or compressing is enabled, saving much of the processing resource of the video conference recording device 400. However, for endpoints that need combining processing of audio streams and video streams, it is not appropriate to use direct switching.

Figure 6:
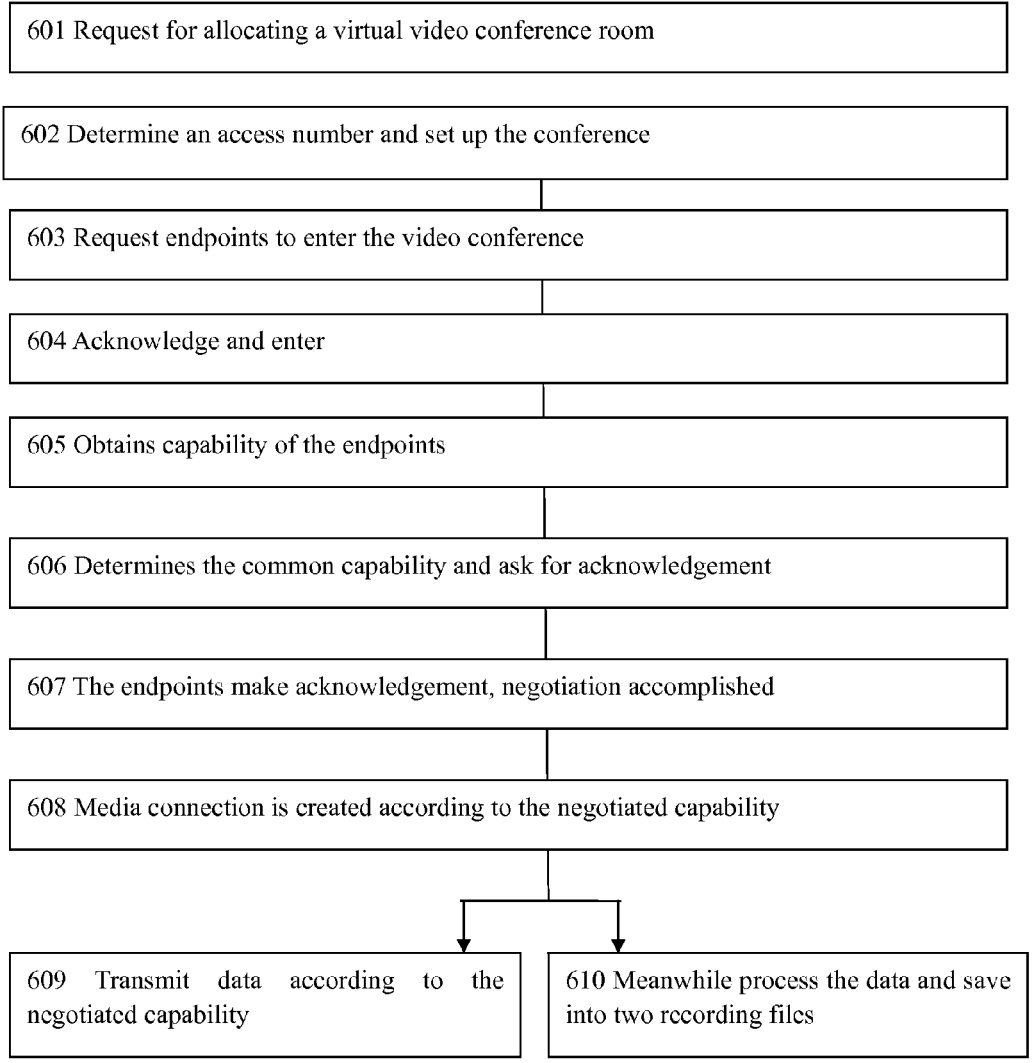
FIG. 6 illustrates the flowchart of creating the media connection and recording using the video conference recording device according to a preferred embodiment.

FIG. 6 illustrates a flowchart of creating the media connection and recording using the video conference recording device. In one embodiment, a user generates DTMF signals through an endpoint and sends them to the video conference recording device 400 to ask for allocating a virtual video conference room (601). Then the user specifies an access number or the video conference recording device 400 allocates automatically an access number, and the user setup the beginning time of the conference and endpoints who will participate in the conference are the first video conference endpoint and the second video conference endpoint (602). When the time to begin the conference comes, the video conference recording device 400 sends a message through the network to the first video conference endpoint and the second video conference endpoint who will participate in the conference requesting them to enter the video conference (603). Then video conference recording device 400 receives acknowledgement messages from the first video conference endpoint and the second video conference endpoint, thus enabling the first video conference endpoint and the second video conference endpoint to enter the virtual video conference room (604). Next, the video conference recording device 400 obtains the capability of the first video conference endpoint and the second video conference endpoint which can include audio/video coding protocols, audio/video code rate, video resolution, video frame rate (605). Accordingly, the video conference recording device 400 determines the capability supported by both the first video conference endpoint and the second video conference endpoint, which are sent to the first video conference endpoint and the second video conference endpoint for acknowledgement (606). For example, if the first video conference endpoint supports the video resolution of 1080p, while the second video conference endpoint supports the video resolution of 720p, then video conference recording device 400 determines the capability supported by both the first video conference endpoint and the second video conference endpoint is the video resolution of 720p. Then the first video conference endpoint and the second video conference endpoint make acknowledgement, negotiation accomplished (607). Thus a media connection between the first video conference endpoint and the second video conference endpoint is created according to the negotiated capability (608). Thus the first video conference endpoint and the second video conference endpoint send and receive audio, video and/or other content data to and/or from each other according to the negotiated capability (609). Meanwhile audio, video and/or other content data of the video conference is processed to make unified coding formats, and the processed data is saved into two recording files, as mentioned above (610).

Alternatively, the way to begin recording could also be setup which can include triggering the recording once media connection is created, triggering the recording at a predetermined time or triggering the recording by the user. Alternatively, in steps 609 and 610, the user interface module 402 could be run on endpoints, and setup of the way to begin, pause and end recording and control and management of video conference recording could be done through the user interface module 402.

Alternatively, in above mentioned embodiments, if the time to begin the conference is setup, reservation time of the virtual video conference room could also be setup at the same time. For example time in a range of 5-120 minutes; if there is no endpoint entering into the virtual video conference room for the reservation time after beginning time arrives, the virtual video conference room is removed. If the virtual video conference room is hoped to be reserved permanently, reservation time setup is not available.

Figure 7:
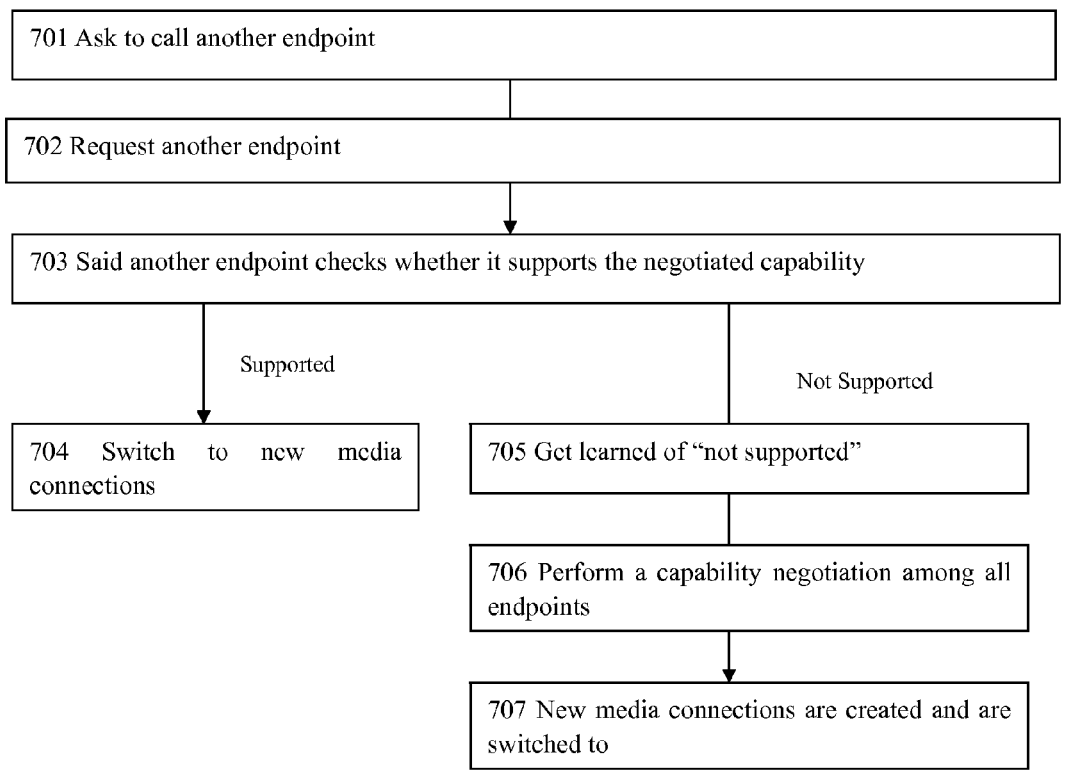
FIG. 7 illustrates the flowchart of requesting other endpoints to participate in the video conference during the conference according to a preferred embodiment.

FIG. 7 illustrates a flowchart of requesting other endpoints to participate in the video conference during the conference.

Actually when a video conference is held, there may be a need to call another endpoint to enter the conference. In such a case, after the steps in FIG. 5 or 6, the following steps are performed:

The video conference recording device 400 receives a control message sent from the first video conference endpoint or second video conference endpoint, the control message is used to request the video conference recording device 400 to call a third video conference endpoint to participate in the video conference (701). Then the video conference recording device 400 sends a message to the third video conference endpoint based on the negotiated capability requesting it to participate in the video conference (702). Then the third video conference endpoint checks whether it supports the negotiated capability (703). If it supports, the third video conference endpoint sends acknowledgement message to video conference recording device 400, thus video conference recording device 400 creates media connections among the first video conference endpoint, the second video conference endpoint and the third video conference endpoint, audio, video and/or other content data of the video conference is switched on new media connections and original media connection is released (704). If the third video conference endpoint doesn't support the negotiated capability, then the following steps are performed: the video conference recording device 400 receives the message that the negotiated capability is not supported by the third video conference endpoint (705). Next, the video conference recording device 400 performs capability negotiation again among the first video conference endpoint, the second video conference endpoint and the third video conference endpoint (706). Accordingly, new media connections among first video conference endpoint, the second video conference endpoint and the third video conference endpoint according to newly negotiated capability are created, audio, video and/or other content data of the video conference is switched on new media connections and the original media connection is released (707). Alternatively, 705-707 could not be performed, the third video conference endpoint doesn't participate in the video conference.

Figure 8:
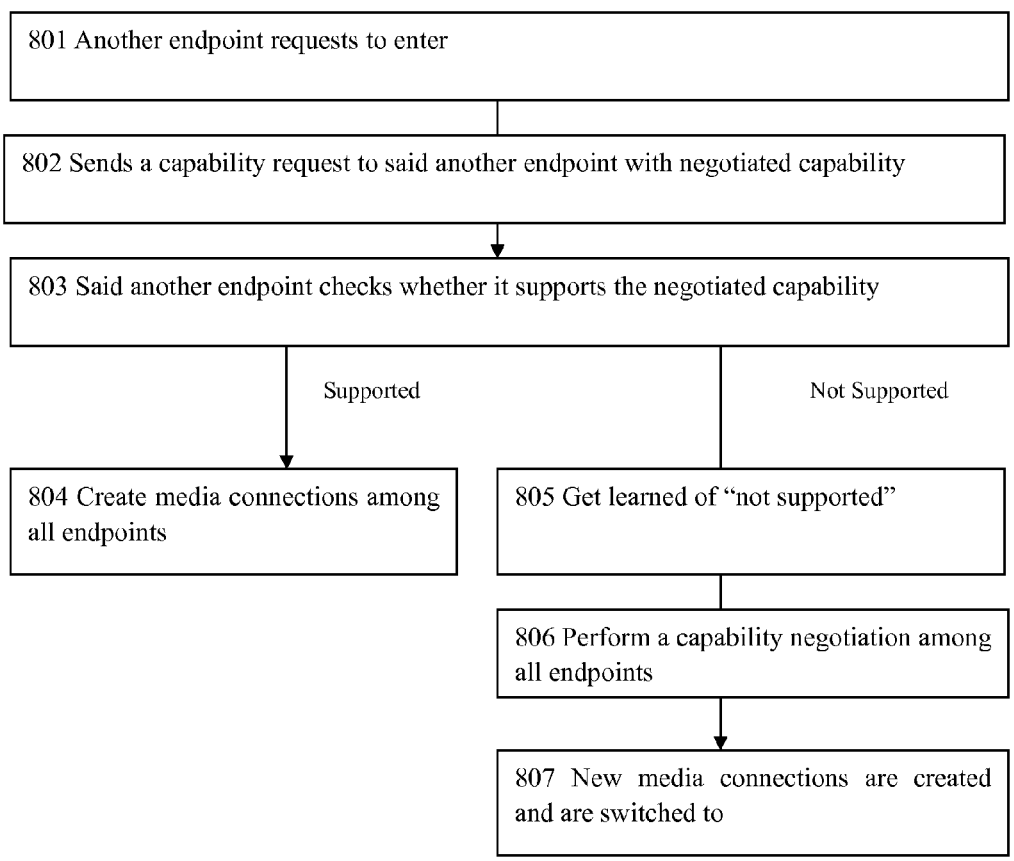
FIG. 8 illustrates the flowchart of other endpoints requesting to participate in the video conference during the conference according to a preferred embodiment.

FIG. 8 illustrates a flowchart of other endpoints requesting to participate in the video conference during the conference. When a video conference is held, there may be a "late comer" participating in the conference. In such a case, after the steps in FIG. 5 or 6, the following steps are performed:

The third video conference endpoint requests to participate in the video conference through the access number (801). Then the video conference recording device 400 sends a capability request to the third video conference endpoint with the negotiated capability (802). Then the third video conference endpoint checks whether it supports the negotiated capability (803). If it supports, the third video conference endpoint sends acknowledgement message to the video conference recording device 400, thus the video conference recording device 400 creates media connections among first video conference endpoint, the second video conference endpoint and the third video conference endpoint (804). If the third video conference endpoint doesn't support the negotiated capability, then the following step are performed: video conference recording device 400 receives the message that the negotiated capability is not supported by the third video conference endpoint (805). The video conference recording device 400 performs capability negotiation again among the first video conference endpoint, the second video conference endpoint and the third video conference endpoint (806). Accordingly, new media connections among first video conference endpoint, the second video conference endpoint and the third video conference endpoint according to newly negotiated capability are created, audio, video and/or other content data of the video conference is switched on the new media connections and original media connection is released (807).

Alternatively, steps 806 and 807 could not be performed. If the third video conference endpoint does not support the negotiated capability, then the third video conference endpoint is not allowed to participate in the video conference.

In a video conference, lecturer may need to demonstrate any type of information and data other than those from audio or video input module such as a microphone or a camera, etc., for example, demo images similar to those made by PowerPoint, video/audio clips, raster/vector images, animations, documents, etc. to every endpoint that participates in the video conference. H.239 standard could be used for transmission. That is, once the media connection is created, a plurality of media streams that share the bandwidth are transmitted between two H.239 endpoints, therefore, a plurality of video streams could be transmitted and shown in the conference system. For example, the VGA signal of an endpoint could be taken as a media stream directly, and transmitted through the EP network interface module 306 so that the desk signal and active audio/video image could be transmitted to other endpoints of the conference at the same time. Use of the method could transmit demo images similar to those made by PowerPoint, opened Word document or other forms of desks to other endpoints of the conference.

In one embodiment, two additional media channels are created based on H.329, each of which is assigned a "task tab" to show the use of the channel. For example, one channel is used for transmission of audio/video clips of video conference endpoints, the other is used for transmission of demo images shown on desks of video conference endpoints. Both transmissions are done as the data from audio/video input module such as microphone, camera, etc. is transmitted. As the transmissions are done on the same media connection, video conference recording device could switch them directly to further display them on other endpoints that participate in the video conference. Then a plurality of media streams transmitted based on H.239 could be recorded.

In another embodiment, recorded video conference needs to be played. For example, endpoints that is connected to the video conference recording device 400 could demand the conference through the video conference recording device 400 using stream control protocols such as TRSP H.323/SIP etc. For example, according to selection of the playing mode, the RD control module 405 controls reading of recording files. If the playing mode is continuous presence mode, then the recording file of continuous presence mode is red, and if the playing mode is lecture mode, then the recording file of lecture mode is red, thus obtaining audio stream, video stream and/or other content data and transmitting them to demanding endpoints. Further, the demanding endpoint requests to reprocess the saved recording files, and then the backend transcoding module makes new coding and decoding of data in the saved recording files into desired formats.

When endpoints that participate in a video conference display the video conference or play the recorded video conference, video images shown on a screen could be arranged in a layout. A layout can include one or more segments used for displaying video images. A segment is a part allocated to a screen of the receiving endpoint that receives video images from one endpoint that participates in the video conference. During a video conference, a segment can cover the whole display area of the screen of local endpoint to show video from another endpoint. Certainly, and alternatively, video data from a plurality of endpoints could be shown at the same time. For example, in one example, in a video conference displayed in lecture mode, the screen of the local endpoint only displays video of one endpoint that participates in the video conference according to dynamic changes of the conference, handover could be done to video among those of video conference endpoints. In another example, in a video conference displayed in CP mode, video data from a plurality of endpoints that participate in the video conference are shown on local endpoint. The video of every endpoint could be displayed in a respective segment of a layout, and the segment could be of the same or of different sizes. Selection of endpoints that are shown and associated with segments of a layout could be changed.

Figure 9:
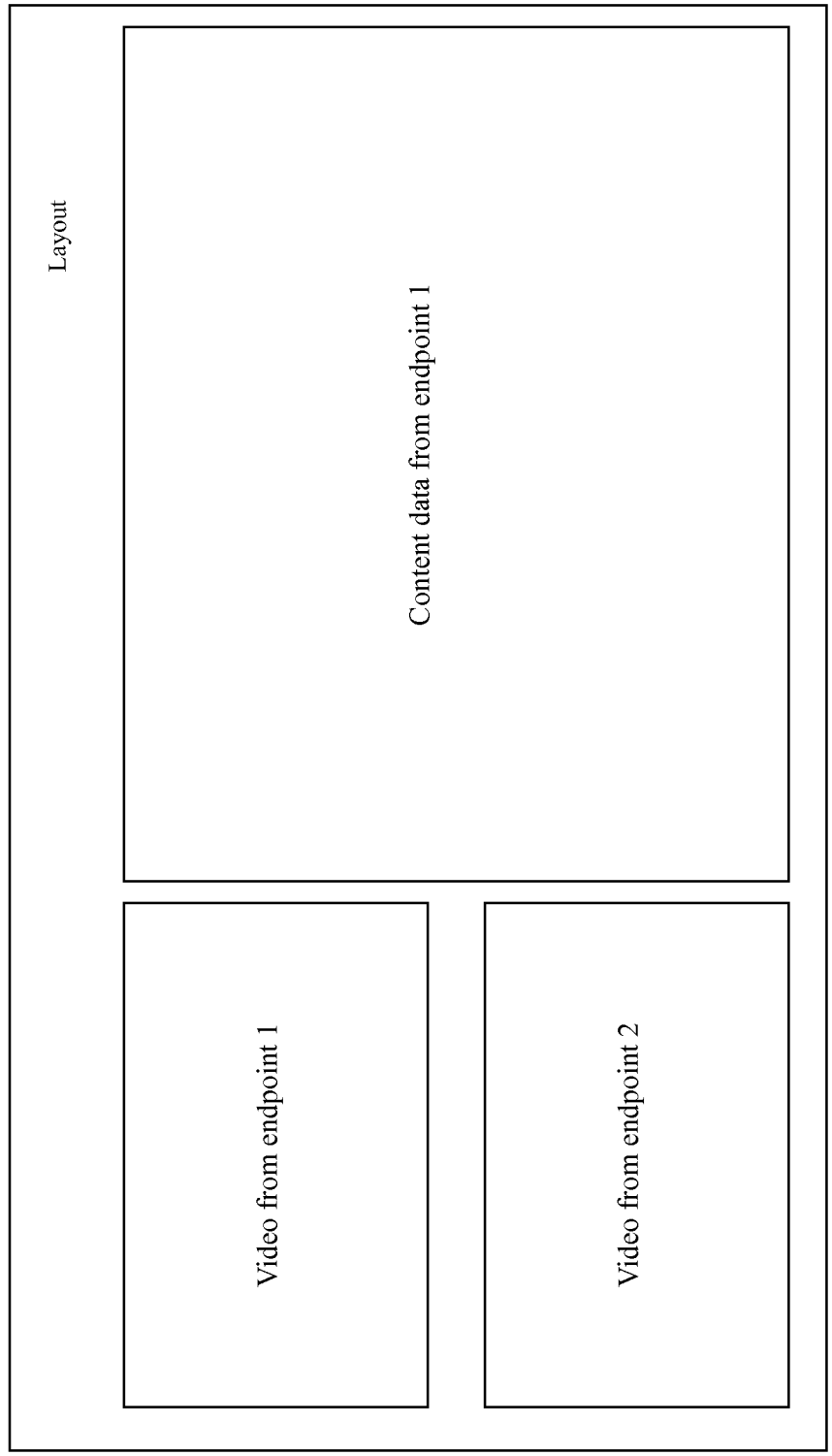
FIG. 9 illustrates the layout according to one embodiment.

FIG. 9 illustrates a layout according to one embodiment. The layout shown in FIG. 9 displays video data from two video conference endpoints, and displays other content data-data from desk of one video conference endpoints.

The foregoing illustration and description of the various inventive concepts are to be considered illustrative or exemplary and not restrictive. It is not intended that the scope of the following claims be limited by the description above. Other variations to the disclosed embodiments can be understood and effected by those skilled in the art, from a study of the drawings, the disclosure, and the appended claims. In the claims, the word "include" does not exclude other elements or steps, and the indefinite article "a" or "an" does not exclude a plurality. Unless otherwise specified, a single processor or other unit may fulfill the functions of a plurality of items recited in the claims or vice versa. The mere fact that certain measures are recited in mutually different dependent claims does not indicate that a combination of these measures cannot be used to advantage.

The invention claimed is:

1. A method of video conferencing among two or more video conference endpoints, comprising steps of:
   processing media data of a video conference into a unified coding format while switching media data of the video conference among two or more video conference endpoints; and
   saving the processed media data into at least two recording files, a first recording file corresponding to a continuous presence mode and a second recording file corresponding to a lecture mode, wherein the first recording file corresponding to a continuous presence mode saves media data generated by the two or more video conference endpoints, and the second recording file corresponding to a lecture mode saves media data generated by a video conference endpoint who is a lecturer in the video conference.

2. The method of video conferencing of claim 1, further comprising steps of:
   performing capability negotiation among the two or more video conference endpoints; and
   creating a media connection among the two or more video conference endpoints according to a negotiated capability.

3. The method of video conferencing of claim 2, wherein if the video conference is held between two video conference endpoints, the media connection switches the media data directly.

4. The method of video conferencing of claim 1, wherein the media data comprises at least one of audio, video, and content data, the content data comprising one or more items selected from the group consisting of demo images, video clips, audio clips, raster images, vector images, animations, and documents.

5. The method of video conferencing of claim 4, wherein:
   the first recording file corresponding to a continuous presence mode saves media data of the two or more video conference endpoints; and
   processing audio data of the two or more video conference endpoints comprises combining the audio data of the two or more video conference endpoints into a single audio stream, and processing video data of the two or more video conference endpoints comprises combining the video data of the two or more video conference endpoints into a layout.

6. The method of video conferencing of claim 4, wherein the second recording file corresponding to a lecture mode saves media data of the lecturer and audio data of other video conference endpoints that participate in the video conference; and
   processing of audio data from the lecturer and the other video conference endpoints comprises combining the audio data from the lecturer and the other video conference endpoints into a single audio stream, and processing of video data of the lecturer and the other video conference endpoints comprises selecting video from one of the lecturer or the other video conference endpoints.

7. The method of video conferencing of claim 6, wherein selecting the video from one of the lecturer or the other video conference endpoints is based on speech detection.

8. The method of video conferencing of claim 3, further comprising, after creating the media connection, the following steps of:
   receiving a control message requesting to call a third video conference endpoint to participate in the video conference sent from one of the two video conference endpoints;
   sending a message to the third video conference endpoint based on the negotiated capability requesting it to participate in the video conference;
   waiting for the third video conference endpoint to check whether it supports the negotiated capability;
   if the third video conference endpoint supports the negotiated capability, then receiving acknowledgement message sent from the third video conference endpoint, creating new media connections among the first video conference endpoint, the second video conference endpoint and the third video conference endpoint, switching media data of the video conference on the created new connections, and releasing an original media connection between the first and second video conference endpoints.

9. The method of video conferencing of claim 8, further comprising, if the third video conference endpoint does not support the negotiated capability, the following steps of:
   receiving a message that the third video conference endpoint does not support the negotiated capability;
   performing capability negotiation among the first video conference endpoint, the second video conference endpoint, and the third video conference endpoint; and
   creating new media connections among the first video conference endpoint, the second video conference endpoint and the third video conference endpoint according the newly negotiated capability, switching media data of the video conference on the created new connections, and releasing an original media connection between the first and second video conference endpoints.

10. The method of video conferencing of claim 2, wherein the capability negotiation comprises negotiation of audio and video coding protocols, audio and video code rate, video resolution, and video frame rate.

11. The method of video conferencing of claim 1, further comprising the following steps of:
receiving from one endpoint a demand for playing a recorded file, wherein the demand for playing indicates a playing mode of either continuous presence mode or lecture mode;
reading the recorded file, wherein if the playing mode is continuous presence mode, then reading the first recording file corresponding to a continuous presence mode, or, if the playing mode is lecture mode, then reading the second recording file corresponding to a lecture mode, thus obtaining recorded media data;
transmitting the recorded media data to said one endpoint for playing.

12. The method of video conferencing of claim 11, further comprising reprocessing the recorded media data prior to transmission.

13. The method of video conferencing of claim 12, wherein the processing and reprocessing comprise one or more of uncompressing, decoding, and combining audio or video streams and coding or compressing audio or video streams.

14. A video conferencing device comprising:
a network interface module configured to receive and transmit media data;
a switching module configured to switch the media data;
a backend transcoding module configured to process the media data into a unified coding format and save the processed media data into at least two recording files, a first recording file corresponding to a continuous presence mode and a second recording file corresponding to a lecture mode; and
a storage module configured to save the recording files;
wherein the first recording file corresponding to a continuous presence mode saves media data generated by the two or more video conference endpoints, and the second recording file corresponding to a lecture mode saves media data generated by a video conference endpoint who is a lecturer in the video conference.

15. The video conferencing device of claim 14, wherein the switching module is further configured to:
perform capability negotiation among two or more video conference endpoints; and
create a media connection among the two or more video conference endpoints according to the negotiated capability.

16. The video conferencing device of claim 15, wherein if the video conference is held between two video conference endpoints, the media connection switches the media data directly.

17. The video conferencing device of claim 14, wherein the media data comprises at least one of audio, video, and content data, the content data comprising one or more items selected from the group consisting of demo images, video clips, audio clips, raster images, vector images, animations, and documents.

18. The video conferencing device of claim 17, wherein:
the first recording file corresponding to a continuous presence mode saves media data of two or more video conference endpoints; and
wherein processing audio data of the two or more video conference endpoints comprises combining the audio data of the two or more video conference endpoints into a single audio stream, and processing video data of the two or more video conference endpoints comprises combining the video data of the two or more video conference endpoints into a layout.

19. The video conferencing device of claim 17, wherein the second recording file corresponding to a lecture mode saves media data of the lecturer and audio data of other video conference endpoints that participate in the video conference; and
processing of audio data from the lecturer and the other video conference endpoints comprises combining the audio data from the lecturer and the other video conference endpoints into a single audio stream, and processing of video data of the lecturer and the other video conference endpoints comprises selecting video from one of the lecturer or the other video conference endpoints.

20. The video conferencing device of claim 19, wherein the selection of video from one of the lecturer or the other video conference endpoints is performed by the backend transcoding module.

21. The video conferencing device of claim 16, wherein the network interface module is further configured to:
receive a control message requesting to call a third video conference endpoint to participate in the video conference sent from one of the two video conference endpoints;
send a message to the third video conference endpoint based on the negotiated capability requesting it to participate in the video conference;
if the network interface module receives an acknowledgement message from third video conference endpoint indicating that the third video conference endpoint supports the negotiated capability, then the switching module is further used to:
create new media connections among the first video conference endpoint, the second video conference endpoint, and third video conference endpoint, and
switch media data of the video conference on the new connections and releasing an original media connection between the first and second video conference endpoints.

22. The video conferencing device of claim 21, wherein:
if the network interface module receives a message from the third video conference endpoint indicating that the third video conference endpoint does not support the negotiate capability, then the switching module is further used to:
negotiate capability again among the first video conference endpoint, the second video conference endpoint and third video conference endpoint;
create new media connections among the first video conference endpoint, the second video conference endpoint, and the third video conference endpoint according to the newly negotiated capability; and
switch media data of the video conference on the new connections and release the original media connection between the first and second video conference endpoints.

23. The video conferencing device of claim 15, wherein the capability negotiation comprises negotiation of audio and video coding protocols, audio and video code rate, video resolution, and video frame rate.

24. The video conferencing device of claim 14, wherein the video conferencing device is further configured to:
receive from one endpoint, via the network interface module, a demand for playing a recorded file, wherein the demand for playing a recorded file indicates a playing mode of either continuous presence mode or lecture mode;

read the recorded file using the backend transcoding module, wherein if the playing mode is continuous presence mode, then the backend transcoding module reads the first recording file corresponding to a continuous presence mode, and if the playing mode is lecture mode, then the backend transcoding module reads the second recording file corresponding to a lecture mode, thus obtaining media data transmitting the obtained media data to said one endpoint for playing via the network interface module.

25. The video conferencing device of claim 24, wherein the backend transcoding module reprocesses the obtained media data.

26. The video conferencing device of claim 25, wherein processing and reprocessing comprise one or more of uncompressing, decoding, and combining audio or video streams and coding or compressing audio or video streams.

27. A method of recording a video conference, the method comprising receiving and processing one or more media streams from each of a plurality of endpoints and saving the processed media streams into at least two recording files, a first recording file corresponding to a continuous presence mode and a second recording file corresponding to a lecture mode; wherein:

saving the processed media stream into the first recording file corresponding to the continuous presence mode comprises:

storing a composite audio stream, wherein the composite audio stream is a combination of two or more audio streams from the received one or more media streams from each of the plurality of endpoints; and storing a composite video stream, wherein the composite video stream is a combination of two or more video streams from the received one or more media streams from each of the plurality of endpoints; and saving the processed media stream into the second recording file corresponding to the lecture mode comprises:

storing a composite audio stream, wherein the composite audio stream is either: a combination of two or more audio streams from the received one or more media streams, or a selected audio stream from the received one or more media streams from each of the plurality of endpoints; and storing a selected video stream, wherein the selected video stream is a video stream from the received one or more media streams from each of the plurality of endpoints.

28. The method of claim 27 wherein the composite video stream is a layout including the combination of two or more video streams and at least one content stream, the content stream comprising at least one of demo images, video or audio clips, raster or vector images, animations, or documents.

29. The method of claim 27 wherein the selected video stream is a video stream of a lecturer in the video conference.

30. The method of claim 28 wherein the selected video stream is a layout comprising a video stream of a lecturer in the video conference and a content stream of a lecturer in the video conference, the content stream comprising at least one of demo images, video or audio clips, raster or vector images, animations, or documents.

* * * * *